April 16, 1968
A. HILDE, JR
3,378,025
MOBILE SYSTEM FOR EVACUATING AND
RECHARGING PORTABLE COMMODES
Filed Nov. 16, 1965
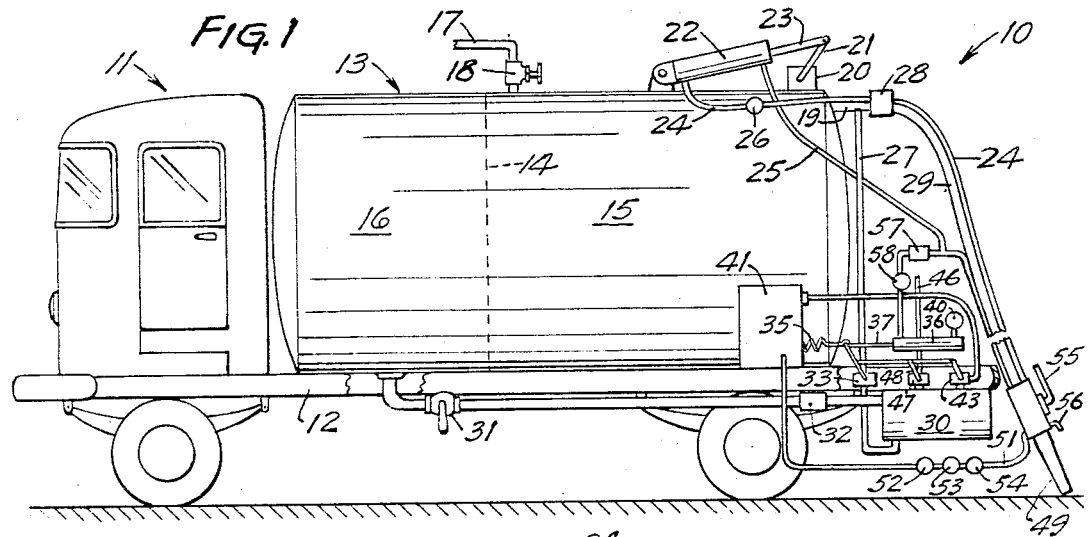
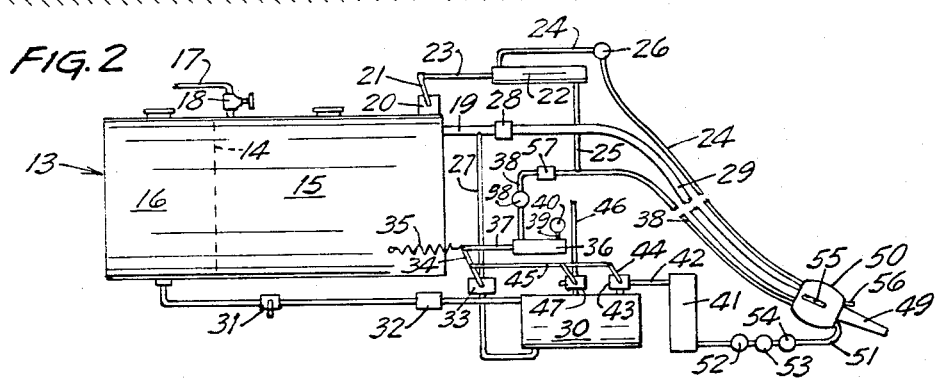
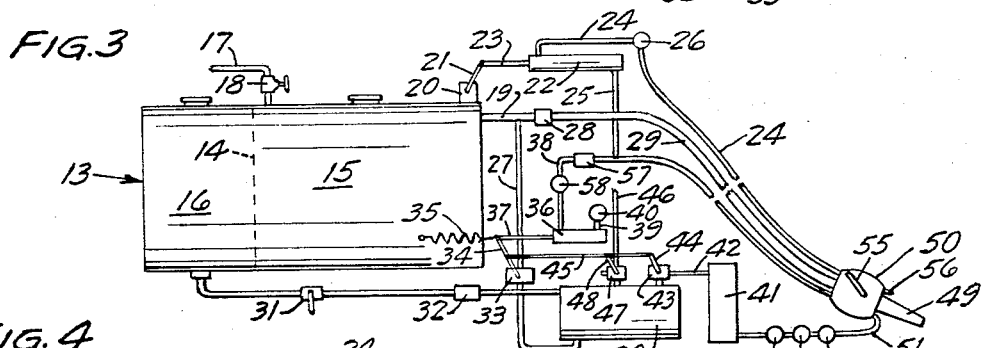
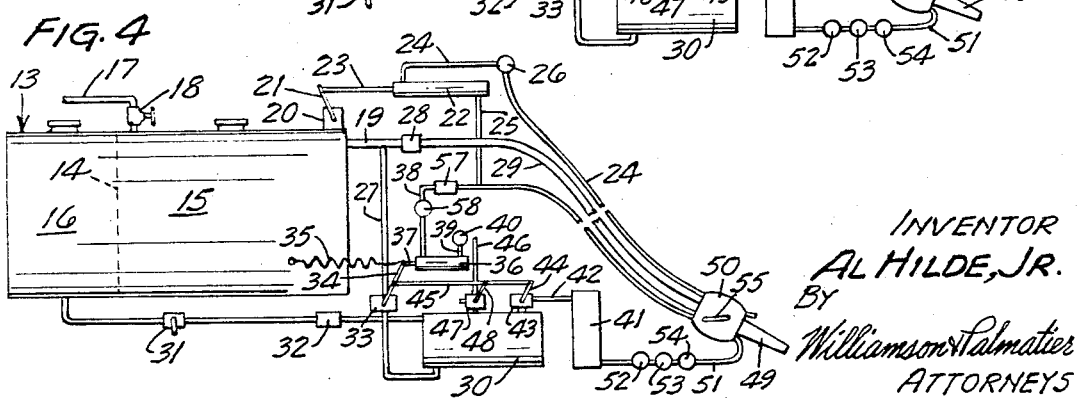
INVENTOR
AL HILDE, JR.
BY
Williamson & Palmatier
ATTORNEYS

United States Patent Office 3,378,025
Patented Apr. 16, 1968

3,378,025
MOBILE SYSTEM FOR EVACUATING AND
RECHARGING PORTABLE COMMODES
Al Hilde, Jr., 925 C. Kingsview Lane,
Minneapolis, Minn. 55427
Filed Nov. 16, 1965, Ser. No. 508,034
5 Claims. (Cl. 137—205)

ABSTRACT OF THE DISCLOSURE

A vehicle mounted evacuation and recharge system for evacuating refuse from a portable commode and for recharging the same in one cycle of operation including a tank structure mounted on the vehicle and including a refuse chamber and a chemical supply chamber separated from each other. An evacuation conduit and a recharge conduit each respectively connected to the refuse chamber and chemical supply chamber and each being connected in communicating relation to a common conduit having a nozzle mechanism at its free end. A pump for producing negative pressure within the refuse chamber. A valve mechanism and valve actuating mechanism for controlling the flow of liquid though the evacuation conduit, and the valve mechanism and valve actuating mechanism for controlling the flow of fluid through the recharge conduit. A control valve mechanism interposed in flow controlling relation with respect to the common conduit adjacent the nozzle mechanism and controlling operation of the valve actuating mechanisms to permit a user to selectively evacuate liquid from a portable commode, and then recharge the portable commode with a fresh supply of liquid while being remotely located with respect to the vehicle.

---

This invention relates to a mobile evacuating and recharging system for evacuating refuse from a portable commode and for recharging the same with a liquid chemical in one cycle of operation.

A general object of this invention is to provide a novel truck mounted apparatus system for evacuating refuse material from a chemical type portable commode and for recharging the commode with a fresh supply of the chemical in one cycle of operation.

A more specific object of invention is to provide a novel truck mounted apparatus system of the class described including a tank having a refuse chamber and a chemical chamber therein, interconnected to a common conduit provided with control means which is operable to permit evacuation of liquid refuse from a chemical type commode into the refuse chamber, the control means being operable to thereafter permit recharging of the commode with a fresh supply of liquid chemical from the chemical chamber.

A further object of this invention is a provision of an apparatus system of the class described wherein metering means are provided for accurately metering a predetermined amount of the chemical prior to the actuation of the recharge phase of the cycle.

These and other objects and advantages of this invention will more fully appear from the following description made in connection with the accompanying drawings wherein like reference characters refer to the same or similar parts throughout the several views, and in which:

FIG. 1 is a side elevational view of the mobile evacuating and recharging apparatus system;

FIG. 2 is a diagrammatic illustration of the apparatus system with the control means in the neutral position prior to the initiation of the evacuation-recharge cycle;

FIG. 3 is a diagrammatic view of the evacuation and recharge apparatus system with the components thereof illustrated in their operable position during the evacuation phase; and FIG. 4 is a diagrammatic view of the system similar to FIGS. 2 and 3 but with the various components thereof illustrated in the operative condition during the recharge phase of the cycle.

Referring now to the drawings and more specifically to FIG. 1 it will be seen that one embodiment of the novel mobile evacuation and recharge apparatus system designated generally by the reference numeral 10 is there shown. This apparatus system includes a suitable vehicle such as a truck 11 provided with a chassis or frame 12 upon which is mounted a relatively large tank structure 13. This tank structure 13 is provided with a partition that divides the interior of the tank structure into two separate compartments. The rearmost and largest compartment defines a refuse chamber 15 while the forwardmost and smallest compartment defines a chemical supply chamber 16.

The refuse chamber 15 is connected by a suitable conduit 17 to an evacuation or vacuum pump (not shown) which is suitably mounted on the chassis 12. The vacuum pump when operated subjects the refuse chamber 15 to a negative pressure or vacuum and a suitable valve 18 may be provided for selectably opening and closing the conduit 17 with respect to the refuse chamber. An evacuation conduit 19 is connected in communicating relation to the upper rear portion of the tank structure 13 and communicates with the interior of the refuse chamber 15. A valve mechanism 20 is interposed in flow controlling relation between the evacuation conduit 19 and the refuse chamber 15 and is shiftable between open and closed positions to selectively intercommunicate the evacuation conduit and close the same with respect to the refuse chamber. This valve mechanism 20 is provided with an operating arm 21 which is disposed in the position llustrated in FIGS. 1 and 3 when the valve mechanism is in the open condition and is disposed in the position illustrated in FIG. 4 when the valve mechanism 20 is in the closed position.

Means are provided for actuating the valve mechanism 20 and this actuating means includes a pneumatic cylinder and piston unit comprised of a cylinder 22 having a piston movable therein to which is connected a piston rod 23. It will be noted that the piston rod 23 is pivotally connected at its free end to the operating arm 21 whereby upon shifting of the movement of the piston rod 23, the valve mechanism 20 may be selectively open and closed. It will be noted that the cylinder 22 has a conduit 24 connected thereto for moving the piston rod axially thereof in one direction and also has another conduit 25 therein through which air is supplied for moving the piston rod in the opposite direction. It will be noted that a oiler mechanism 26 is interposed in communicating relation with the conduit 24 for suitably lubricating the cylinder and piston unit.

One end of an elongate recharge conduit 27 is connected in communicating relation to the evacuation conduit 19 adjacent a quick coupling unit 28 to which is connected an elongate flexible common conduit 25. It will be noted that a metering tank or receptacle 30 is interposed in communicating relation with respect to the recharge conduit 27 and that the other end of this recharge conduit is connected in communicating relation with respect to the chemical supply chamber 16 of the tank structure 13. A manually operable shut-off valve 31 and a one-way valve 32 interposed in flow controlling relation with respect to the recharge conduit between the chemical supply chamber 16 and the metering tank 30. During operation of the apparatus system 10, the manually operable shut-off valve 31 will be normally open and the one-way valve 32 allows the fluid chemical to flow from the chemical supply chamber 16 and towards the metering tank 30.

A valve mechanism 33 is interposed in flow controlling relation with respect to the recharge conduit between the metering tank 30 and a point of connection with the evacuation conduit 19. This valve mechanism 33 is provided with an operating arm 34 which is shiftable to selectively open and close the valve mechanism 33 with respect to the conduit 27. A spring element 35 is connected to the operating arm 34 and to a stationery structure such as the tank structure 15 to normally urge the operating arm 34 towards the closed position. To this end it is pointed out that the valve mechanism 33 will be in the closed condition when the operating arm 34 is in the position illustrated in FIGS. 2 and 3 and is in the open condition when the operating arm 34 is in the position illustrated in FIG. 4.

Means are provided for shifting the operating arm 34 from the normally closed to the opened position and to open the valve mechanism relative to the conduit 27 and this actuator means includes a cylinder and piston unit comprised of a cylinder 36. The cylinder 36 has a piston axially movable therein to which is connected a piston rod 37 which in turn is pivotally connected to the operating arm 34 for shifting the latter between the open and closed positions. Air under pressure is supplied to the cylinder 36 through a conduit 38 which in the embodiment shown retracts piston rod 37 against the bias of the spring element 35. Air is exhausted from the piston 36 through an outlet conduit 39 which is connected at its other end to an air filter 40. It will therefore be seen that when air is supplied through the conduit 38, the piston rod 37 will be retracted to shift the operating arm 34 from its normally spring urged closed position to the open position as illustrated in FIG. 4 and the fresh supply of chemical within the metering tank 30 will be discharged therefrom through the recharge conduit and thereafter into the common conduit 29.

In order to assure the liquid within the metering tank 30 will be quickly discharged therefrom, air is supplied to the receptacle 30 from an air supply tank 41 through a conduit 42 which is connected in communicating relation with respect to the metering tank 30. A valve mechanism 43 having an operating arm 44 is interposed in flow controlling relation with respect to the conduit 42, and when the valve 43 is opened, the metering tank will be subjected to substantial air pressure which forces the liquid therefrom through the recharge conduit 27 and into the common conduit 29. The operating arm 44 is movable between an open and closed condition by a control link 45 which is pivotally connected to the operating arm 44 and to the operating arm 34 of the valve mechanism 33. The valve mechanism 43 is simultaneously opened with the opening of the valve mechanism 33 and is therefore normally urged to the closed position. Therefore air is automatically supplied to the metering tank 30 when the valve mechanism 33 is open so that air is supplied to the metering tank only when needed to assist in removal of the liquid chemical from the metering tank.

Means are also provided for removing or bleeding air from the metering tank after the liquid has been discharged therefrom whereby this tank may be refilled for the next recharge cycle. This means includes a bleed or outlet conduit 46 which is connected in communicating relation to the metering tank. A valve mechanism 47 is interposed in flow controlling relation with respect to the bleed conduit 46 and this valve mechanism 47 is provided with an operating arm 48 which is shiftable to selectively open and close the valve mechanism 47. This operating arm 48 is shifted between the open and closed position by means of the control link 45 to which it is connected. It is pointed out that the valve mechanism 47 is in the closed condition when the valve mechanisms 33 and 43 respectively are in the open condition. Conversely, the valve mechanism 47 is opened simultaneously during closing of the valve mechanisms 33 and 43 respectively. It will therefore be seen that the valve mechanism 47 is normally urged to the open condition by the spring element 35.

It will be seen that the common conduit 29 has a nozzle mechanism 49 secured to its free end which facilitates the out flow and the in flow of liquid relative thereto. A three way control valve device for controlling the air to the respective piston and cylinder units for respectively operating the valve mechanism 20 and 33 respectively is also provided adjacent the nozzle mechanism 49. This control valve device 50 is connected in flow controlling relation with respect to the conduits 24 and 38, repectively, and through which the air is supplied to the cylinders 22 and 36 respectively. This control valve device 50 is also disposed in flow controlling relation with respect to an inlet or supply conduit 51 which is connected in communicating relation with the air tank 41 to supply air to the control valve device and thereafter selectively through the conduits 24 and 38 to cylinders 22 and 36. An air filter 52, an air regulator 53 and an air pressure gauge 54 are interposed in the conduit 51 to permit the inlet air to be filtered, regulated and the pressure determined.

The valve control device 50 is provided with an actuator handle 55 which is selectively shiftable from a neutral position as illustrated in FIG. 2, to either an evacuation position as illustrated in FIG. 3 or a recharge position as illustrated in FIG. 4. When the actuator handle 55 is in the neutral position air under pressure from the supply or inlet conduit 51 is not intercommunicated by the control valve device 50 with either of the conduits 24 or 38. However, when the actuator handle 55 is shifted to the evacuation position, air is supplied through the conduit 24 to actuate the cylinder and piston unit which thereby opens the valve mechanism 20. Conversely, when the actuator handle 55 is shifted from the neutral position to the recharge position as illustrated in FIG. 4, the supply line 51 is closed with respect to conduit 24 but is opened with respect to conduit 38 and air is ultimately supplied to the cylinder 36 for shifting the piston therein to thereby open the valve mechanism 33.

During operation of the apparatus system 10, the system will be in the neutral position as illustrated in FIG. 2 and it will be noted that both the valve mechanism 20 and the valve mechanism 33 will be in the closed condition. The first phase or step in the cycle of operation, is to insert the nozzle into the chemical refuse of the portable commode and thereafter shift the actuator handle 55 to the evacuation position as illustrated in FIG. 3. When this occurs, the conduit 24 will be intercommunicated with the supply conduit 51 while the conduit 38 will be closed with respect to this supply conduit. Air will be supplied to the cylinder 22 to cause shifting movement therein and movement of the operating arm 21 from its closed position to the open position as illustrated in FIG. 3. The refuse chamber 15 will be subjected to a vacuum or negative pressure by operation of the vacuum pump (now shown) which is connected to the refuse chamber by means of the conduit 17. Since the common conduit 29 is intercommunicated with the refuse chamber, the liquid refuse will flow through the conduit 29 and into the refuse chamber 15. This evacuation phase will continue until all of the liquid chemical refuse in the portable commode is removed.

It is pointed out, however, as soon as the valve mechanism 20 has been shifted to the open position, the actuator handle 55 will thereafter be returned to the neutral position and will be allowed to remain in the neutral position during the evacuation phase. The valve mechanism 20 will remain open but the air in the cylinder 22 will flow back through the conduit 24 and will be discharged through a discharge port 56 in the control valve device 50. To this end it is pointed out that when the actuator handle 55 is in the neutral position, the conduit 24 will be intercommunicated with the exterior by the discharge port 56 to thereby releave the pressure within the cylinder 22.

When the liquid refuse has been evacuated from the portable commode, the actuator handle 55 will thereafter be shifted from the neutral position to the recharge position as illustrated in FIG. 4 of the drawing. Conduit 38 will be intercommunicated with the supply conduit 51 while conduit 24 will be closed with respect to the supply conduit 51.

It is desirable to close the valve mechanism 20 prior to the opening of the valve mechanism 33 and although, the conduit 25 is connected to the conduit 38, means are provided for permitting operation of the cylinder and piston unit for closing the valve mechanism 20 prior to opening of the valve mechanism 33. This means includes an air restrictor 57 which is interposed in flow controlling relation with respect to conduit 38 and disposed between the cylinder 36 and the point of connection of the conduit 25 with respect to the conduit 38. With this particular arrangement, the air restrictor 57, restricts the flow of air to the cylinder 36 while the air flows freely through the conduit 25 and to the cylinder 22 so that the piston therein is shifted to move the operating arm 21 to the closed position. Thereafter a back pressure develops in the line so that the resistance offered by the air resistor mechanism 57 will be overcome and air will be allowed to flow into the cylinder 36. It should be pointed out that since the air pressure in the cylinder 22 which was used to shift the valve mechanism from the neutral to the open position has been releaved from the cylinder 22, shifting movement of the piston to move the operating arm into the closed position is instantaneous.

The valve mechanism 33 will thereafter be opened which also simultaneously opens the air pressure valve mechanism 43 so that air under pressure is supplied to the metering tank 30 which obtains a predetermined amount of fresh liquid chemical. In the embodiment shown, the metering tank 30 contains approximately 8 gallons of the liquid chemical which is quickly discharged through the evacuation conduit 27 into the common conduit 29 and thereafter from the nozzle mechanism 49 into the portable commode. The air pressure supplied through the conduit 42 forces the liquid through the conduit 27 and the pressure in the line also prevents the discharge of the fresh chemical from the chemical supply chamber by its action exerted on the one-way valve mechanism 32. It is pointed out that the valve mechanism 47 will be in the closed position during the recharge phase and the actuator handle 55 will be retained in the recharge position until all of the fresh chemical from the metering tank is discharged from the system. This can be easily determined by an operator because of the sound created by the blast of air when all of the fresh chemical has been discharged from the system.

Thereafter, the operator will shift the actuator handle 55 to the neutral position which closes the supply of air into the cylinder 36. The action of the spring element 35 will then cause the operator arm 34 to be returned to the closed position thereby closing the valve mechanism 33 which action also simultaneously closes the valve mechanism 33 and opens the valve mechanism 47. When this occurs, the air pressure in the metering tank and system will be relieved through the outlet conduit 46 until the pressure within the metering tank is approximately at atmospheric pressure. This permits the one-way valve mechanism 32 to open and the liquid chemical will thereafter flow by action of gravity into the metering tank 30 until the same is filled to capacity. It is pointed out that the air pressure within the cylinder 36 is bled off or relieved to the exterior through a conduit 39 and air filter 40.

It will therefore be seen from the foregoing that I have provide a novel apparatus system for very effectively evacuating the liquid refuse from a portable type commode and for recharging the same with fresh supply of chemical in one cycle of operation which thereby permits a substantial saving in both labor and time.

It will also be seen that I have provided a novel apparatus system for evacuating and recharging chemical type portable commodes which is not only of relatively simple construction and operation, but one which functions in a more efficient manner then any hereto known comparable device.

It will, of course, be understood that various changes may be made in the form, details, arrangement and proportions of the various parts without departing from the scope of my invention.

What we claim is:

1. A mobile evacuating and recharge apparatus system for evacuating refuse from a portable commode and for recharging the same in one cycle of operation, said system comprising,
    a mobile support,
    a tank structure mounted on said support and having a refuse chamber and a chemical supply chamber therein separated from each other,
    an evacuation conduit having one end thereof connected in communicating relation with said refuse chamber,
    a recharge conduit having one end thereof connected in communicating relation with said chemical supply chamber,
    a common conduit connected in communicating relation with the respective other ends of said evacuation and recharge conduits, said common conduit having a free end defining a nozzle mechanism,
    means for producing the negative pressure within said refuse chamber,
    a first valve mechanism interposed in flow controlling relation with said evacuation conduit and being shiftable between conduit open and conduit close positions,
    a first valve actuating mechanism operatively connected with said first valve mechanism for shifting the same between said open and close positions,
    a second valve mechanism interposed in flow controlling relation with said recharge conduit and being shiftable between conduit open and conduit close positions,
    a second valve actuating mechanism operatively connected with said second valve mechanism for shifting the same between open and close positions,
    a control valve mechanism remotely disposed with respect to said first and second valve actuating mechanisms and operatively connected with the latter in controlling relation thereto, said control valve mechanism being interposed in flow controlling relation with said common conduit adjacent said nozzle mechanism, and including a shiftable control element being shiftable between neutral, evacuation and recharge positions, said control element when shifted into the evacuation position operating said first valve actuating mechanism and causing said first valve member to be opened whereby refuse material will be evacuated from a portable commode into the evacuation chamber, said control element when shifted from said evacuation position to said neutral position and thereafter to said recharge position operating said first valve actuating mechanism to cause said first valve mechanism to be closed, and thereafter operating said second valve actuating mechanism and causing said second valve mechanism to be opened, whereby predetermined amount of liquid chemical will be discharged through the common conduit to a portable commode for recharging the same.

2. The apparatus system as defined in claim 1 wherein said valve actuating means comprises a pair of piston and cylinder units,
    conduit means interconnecting each of said piston and cylinder units with a supply of fluid under pressure, and said control valve mechanism being interposed in controlling relation with said conduit means.

3. The apparatus system as defined in claim 1 and a metering device including a metering receptacle interposed in communicating relation in said recharge conduit and receiving a predetermined amount of liquid chemical from the chemical supply chamber,
   an air pressure conduit connected in communicating relation with said metering receptacle and to a supply of air under pressure,
   and valve means interposed in controlling relation with respect to said air pressure conduit and being shiftable between open and close positions for opening and closing said air pressure conduit, means interconnecting said last mentioned valve means to said second valve actuating means whereby said last mentioned valve means is open when said second valve mechanism is open and is closed simultaneously during closing of second valve mechanism.

4. The apparatus system as defined in claim 3 wherein said valve actuating means comprises a pair of piston and cylinder units.

5. The apparatus system as defined in claim 3 and an air bleed mechanism on said metering receptacle and being shiftable between open and close positions, means interconnecting said air bleed mechanism with said second valve actuating means whereby said air bleed mechanism is closed when said second valve mechanism is in the open condition and is opened when said second valve mechanism is in the closed condition to thereby intercommunicate the interior of the metering receptacle with the exterior to permit air under pressure within the receptacle to be relieved therefrom.

References Cited

UNITED STATES PATENTS

| 1,587,864 | 6/1926 | Sargent | 137—205 |
| 2,004,715 | 6/1935 | Thwaits | 222—144.5 X |
| 2,320,048 | 5/1943 | Parson | 222—144.5 X |

FOREIGN PATENTS

| 686,519 | 1/1940 | Germany. |

ALAN COHAN, *Primary Examiner.*